United States Patent
Chen

(10) Patent No.: US 11,121,975 B2
(45) Date of Patent: *Sep. 14, 2021

(54) FRAMEWORK FOR TEMPORAL LABEL SWITCHED PATH TUNNEL SERVICES

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/819,952

(22) Filed: Mar. 16, 2020

(65) Prior Publication Data
US 2020/0220815 A1    Jul. 9, 2020

Related U.S. Application Data

(63) Continuation of application No. 15/269,098, filed on Sep. 19, 2016, now Pat. No. 10,715,447.
(Continued)

(51) Int. Cl.
*H04L 12/721* (2013.01)
*H04L 12/803* (2013.01)
(Continued)

(52) U.S. Cl.
CPC ........ *H04L 47/125* (2013.01); *H04L 12/4633* (2013.01); *H04L 41/0896* (2013.01);
(Continued)

(58) Field of Classification Search
None
See application file for complete search history.

(56) References Cited

U.S. PATENT DOCUMENTS

| | | |
|---|---|---|
| 8,824,274 B1 | 9/2014 | Medved et al. |
| 2010/0002724 A1 | 1/2010 | Turlington et al. |

(Continued)

FOREIGN PATENT DOCUMENTS

| | | |
|---|---|---|
| CN | 101095311 A | 12/2007 |
| CN | 103957159 A | 7/2014 |
| CN | 104753713 A | 7/2015 |

OTHER PUBLICATIONS

Chen, H., U.S. Appl. No. 15/187,384, 78 pages, filed Jun. 20, 2016, "Elegant Temporal Label Switched Path Tunnel Service Controller."
(Continued)

*Primary Examiner* — Brandon M Renner
(74) *Attorney, Agent, or Firm* — Conley Rose, P.C.

(57) ABSTRACT

A method for establishing a temporal label switched path (T-LSP) implemented in a node in a network. The method includes receiving a path request including a time interval and a set of constraints; obtaining traffic engineering information from a first database; computing, by the node, a path satisfying the time interval and the set of constraints based on the traffic engineering information obtained; storing the time interval and the set of constraints in a second database; and instructing an ingress node of the temporal LSP to signal the temporal LSP in the network along the path computed at a start of the time interval identified in the path request and to tear down the temporal LSP at an end of the time interval identified in the path request.

17 Claims, 9 Drawing Sheets

Related U.S. Application Data

(60) Provisional application No. 62/242,172, filed on Oct. 15, 2015.

(51) Int. Cl.

| | | |
|---|---|---|
| *H04L 12/715* | (2013.01) | |
| *H04L 12/24* | (2006.01) | |
| *H04L 12/46* | (2006.01) | |
| *H04L 12/801* | (2013.01) | |
| *H04L 12/913* | (2013.01) | |
| *H04L 12/911* | (2013.01) | |
| *H04L 12/937* | (2013.01) | |

(52) U.S. Cl.
CPC .............. *H04L 45/04* (2013.01); *H04L 47/18* (2013.01); *H04L 47/724* (2013.01); *H04L 47/781* (2013.01); *H04L 49/254* (2013.01)

(56) References Cited

U.S. PATENT DOCUMENTS

| | | |
|---|---|---|
| 2011/0205902 A1 | 8/2011 | Zi et al. |
| 2012/0188906 A1 | 7/2012 | Ong |
| 2013/0336126 A1 | 12/2013 | Vasseur et al. |
| 2013/0336192 A1 | 12/2013 | Zhao et al. |
| 2015/0103844 A1 | 4/2015 | Zhao et al. |
| 2015/0200838 A1 | 7/2015 | Nadeau et al. |
| 2015/0281074 A1 | 10/2015 | Kubota |
| 2015/0304209 A1 | 10/2015 | Choudhury et al. |
| 2016/0205012 A1 | 7/2016 | Suzuki et al. |
| 2016/0380889 A1* | 12/2016 | Chen .................. H04L 12/4633 370/230 |
| 2017/0222934 A1 | 8/2017 | Ye |
| 2018/0019930 A1 | 1/2018 | Bruno et al. |
| 2018/0278511 A1* | 9/2018 | Bruno ..................... H04L 47/72 |

OTHER PUBLICATIONS

Chen, H., et al., "Framework for Temporal Tunnel Services draft-chen-teas-frmwk-tts-01.txt," Internet Engineering Task Force, Standards Track, Mar. 21, 2016, 25 pages.
Crabbe, E., et al., "PCEP Extensions for PCE-initiated LSP Setup in a Stateful PCE Model draft-ietf-pce-pce-initiated-lsp-04," PCE Working Group, Standards Track, Apr. 17, 2015, 17 pages.
Crabbe, E., et al., "PCEP Extensions for Stateful PCE draft-ietf-pce-stateful-pce-11," PCE Working Group, Standards Track, Apr. 20, 2015, 47 pages.
Bradner, S., "Key words for use in RFCs to Indicate Requirement Levels," Network Working Group, RFC 2119, Mar. 1997, 3 pages.
Braden, R., Ed., "Resource ReSerVation Protocol (RSVP—Version 1 Functional Specification," Network Working Group, RFC 2205, Standard Tracks, Sep. 1997, 112 pages.
Moy, J., "OSPF Version 2," Network Working Group, RFC 2328, Standards Track, Apr. 1998, 188 pages.
Rosen, E., et al., "Multiprotocol Label Switching Architecture," Network Working Group, RFC 3031, Standards Track, Jan. 2001, 61 pages.
Awduche, D., et al., "RSVP-TE: Extensions to RSVP for LSP Tunnels," Network Working Group, RFC 3209, Standards Track, Dec. 2001, 61 pages.
Katz, D., et al., "Traffic Engineering (TE) Extensions to OSPF Version 2," Network Working Group, RFC 3630, Standards Track, Sep. 2003, 14 pages.
Farrel, A., et al., "A Path Computation Element (PCE)-Based Architecture," Network Working Group, RFC 4655, Aug. 2006, 40 pages.
Aggarwal, R., Ed., et al., "Extensions to Resource Reservation Protocol-Traffic Engineering (RSVP-TE) for Point-to-Multipoint TE Label Switched Paths (LSPs)," Network Working Group, RFC 4875, Standards Track, May 2007, 53 pages.
Berger, L., et al., "The OSPF Opaque LSA Option," Network Working Group, RFC 5250, Standards Track, Jul. 2008, 17 pages.
Vasseur, JP., Ed., "Path Computation Element (PCE) Communication Protocol (PCEP)," Network Working Group, RFC 5440, Standards Track, Mar. 2009, 87 pages.
Yasukawa, S., et al., "Path Computation Clients (PCC)—Path Computation Element (PCE) Requirements for Point-to-Multipoint MPLS-TE," Internet Engineering Task Force (IETF), RFC 5862, Jun. 2010, 11 pages.
Zhao, Q., Ed., et al., "Extensions to the Path Computation Element Communication Protocol (PCEP) for Point-to-Multipoint Traffic Engineering Label Switched Paths," Internet Engineering Task Force (IETF), RFC 6006, Standards Track, Sep. 2010, 33 pages.
"OpenFlow Switch Specification," Version 1.5.1 (Protocol Version 0x06), Open Networking Foundation, Mar. 26, 2015, 283 pages.
Foreign Communication From a Counterpart Application, PCT Application No. PCT/CN2016/102162, International Search Report dated Jan. 16, 2017, 4 pages.

\* cited by examiner

FRAMEWORK FOR TEMPORAL LABEL SWITCHED PATH TUNNEL SERVICES

CROSS-REFERENCE TO RELATED APPLICATIONS

This patent application is a continuation of co-pending U.S. patent application Ser. No. 15/269,098, filed Sep. 19, 2016, by Huaimo Chen and entitled "Framework for Temporal Label Switched Path Tunnel Services," which claims the benefit of U.S. Provisional Patent Application No. 62/242,172, filed Oct. 15, 2015, by Huaimo Chen and entitled "Framework for Temporal Label Switched Path Tunnel Services," the teachings and disclosure of which are hereby incorporated in their entireties by reference thereto.

TECHNICAL FIELD

In general, the disclosure describes techniques for software defined networks. More specifically, this disclosure describes techniques that allow for creating a temporal label switched paths in a software defined network in one or more predetermined time intervals.

BACKGROUND

Software defined networking (SDN) is a networking paradigm that decouples network control and forwarding functions. The decoupling of the control plane from the data plane allows for centralization of network control, enabling effective policy administration and flexible management. The centralization of network control facilitates various network functionalities, such as network measurements, traffic engineering, enhanced quality of services, and enhanced access control. With the growing availability of SDN-enabled nodes and protocols, many organizations have started deploying SDN networks.

SUMMARY

In a SDN network, a SDN controller determines routes through the network and configures each node in the network with routing instructions. In a SDN network that employs label switched paths (LSPs) for data transportation, a SDN controller provides a solution for creating LSPs in the network without employing Resource Reservation Protocol (RSVP). Every LSP created by the SDN controller is up forever and network resources are reserved for the LSP forever until the LSP is deleted. However, some LSPs may not be actively carrying traffic at all time. Thus, network resources may not be used efficiently. In addition, the LSPs created by a SDN controller are typically limited to the domain controlled by the SDN controller and may not tunnel through multiple domains. To resolve these and other problems, and as will be more fully explained below, a temporal SDN (T-SDN) controller is used to create temporal LSPs for carrying traffic at one or more particular time intervals according to users' requests and to reserve network resources for the temporal LSPs in corresponding time intervals. In addition, the T-SDN controller coordinates with temporal path computation elements (T-PCEs) to create temporal LSPs that tunnel through multiple domains.

In a first aspect, the disclosure includes a method for establishing a temporal label switched path (T-LSP) implemented in a node in a network. The method includes receiving a path request including a time interval and a set of constraints; obtaining traffic engineering information from a first database; computing, by the node, a path satisfying the time interval and the set of constraints based on the traffic engineering information obtained; storing the time interval and the set of constraints in a second database; and instructing an ingress node of the temporal LSP to signal the temporal LSP in the network along the path computed at a start of the time interval identified in the path request and to tear down the temporal LSP at an end of the time interval identified in the path request.

In a first implementation form of the method according to the first aspect as such, the method further comprises distributing current link bandwidth to other nodes and storing changes in the current link bandwidth in the first database.

In a second implementation form of the method according to the first aspect as such or any preceding implementation form of the first aspect, the traffic engineering information comprises a bandwidth for each link in the network corresponding to the time intervals.

In a third implementation form of the method according to the first aspect as such or any preceding implementation form of the first aspect, the first database is a temporal traffic engineering database (T-TED).

In a fourth implementation form of the method according to the first aspect as such or any preceding implementation form of the first aspect, the second database is a temporal LSP database (T-LSPDB).

In a fifth implementation form of the method according to the first aspect as such or any preceding implementation form of the first aspect, further comprising establishing an LSP without the time intervals corresponding to the path as computed.

In a sixth implementation form of the method according to the first aspect as such or any preceding implementation form of the first aspect, the node is a temporal software defined network (T-SDN) controller.

In a seventh implementation form of the method according to the first aspect as such or any preceding implementation form of the first aspect, the temporal LSP crosses multiple domains.

In an eighth implementation form of the method according to the first aspect as such or any preceding implementation form of the first aspect, each of the multiple domains is controlled by a separate controller.

In a ninth implementation form of the method according to the first aspect as such or any preceding implementation form of the first aspect, the method further comprises receiving the path request from a network administrator.

In a tenth implementation form of the method according to the first aspect as such or any preceding implementation form of the first aspect, the method further comprises receiving the path request from an application.

In a second aspect, the disclosure includes a network element including a memory storage comprising instructions; and a processor in communication with the memory, wherein the processor executes the instructions to cause the network element to: receive a path request including a time interval and a set of constraints; obtain traffic engineering information from a first database; compute a path satisfying the time interval and the set of constraints based on the traffic engineering information obtained; store the time interval and the set of constraints in a second database; and instruct an ingress node of the temporal LSP to signal the temporal LSP in the network along the path computed at a start of the time interval identified in the path request and to tear down the temporal LSP at an end of the time interval identified in the path request.

In a first implementation form of the method according to the first aspect as such, the processor executes the instructions to cause the network element to distribute current link bandwidth to other nodes and store changes in the current link bandwidth in the first database.

In a second implementation form of the method according to the first aspect as such or any preceding implementation form of the first aspect, the traffic engineering information comprises a bandwidth for each link in the network corresponding to the time intervals.

In a third implementation form of the method according to the first aspect as such or any preceding implementation form of the first aspect, the first database is a temporal traffic engineering database (T-TED).

In a fourth implementation form of the method according to the first aspect as such or any preceding implementation form of the first aspect, the second database is a temporal LSP database (T-LSPDB).

In a fifth implementation form of the method according to the first aspect as such or any preceding implementation form of the first aspect, the processor executes the instructions to cause the network element to establish an LSP without the time intervals corresponding to the path as computed.

In a sixth implementation form of the method according to the first aspect as such or any preceding implementation form of the first aspect, the node is a temporal software defined network (T-SDN) controller.

In a seventh implementation form of the method according to the first aspect as such or any preceding implementation form of the first aspect, the temporal LSP crosses multiple domains, and wherein the multiple domains are each controlled by a separate controller.

In an eighth implementation form of the method according to the first aspect as such or any preceding implementation form of the first aspect, the path request is received from a network administrator or an application.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
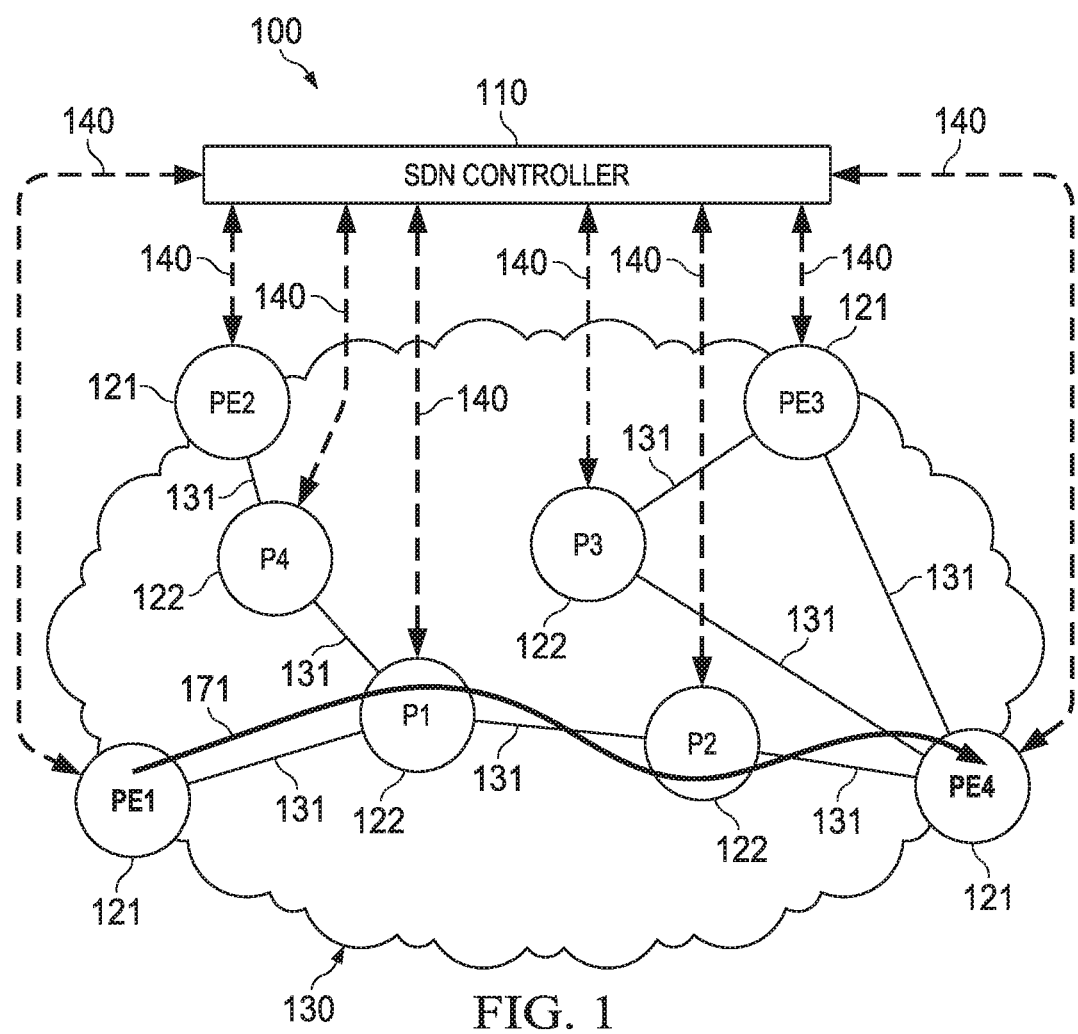
FIG. 1 is a schematic diagram of a SDN system.

FIG. 1 is a schematic diagram of an example of a software-defined network (SDN) system 100. The SDN system 100 comprises a SDN controller 110 and a network 130. The network 130 comprises a plurality of edge nodes 121, shown as PE1, PE2, PE3, and PE4, and a plurality of internal nodes 122, shown as P1, P2, P3, and P4, with some or all nodes interconnected by a plurality of links 131. The edge nodes 121 are located at an edge or a boundary of the network 130. The internal nodes 122 are located within an area of the network 130. The underlying infrastructure of the network 130 may be any type of network such as an electrical network, an optical network, or combinations thereof. The links 131 may comprise physical links such as fiber optic links, electrical links, wireless links and/or logical links used to transport data in the network 130. The network 130 operates under a single network administrative domain. The network 130 may employ any forwarding data plane such as a multiprotocol label switching (MPLS) forwarding data plane. The SDN controller 110 is communicatively coupled to all edge nodes 121 and all internal nodes 122 of the network 130. The system 100 decouples network control and network forwarding functions.

The SDN controller 110 may be a virtual machine (VM), a hypervisor, or any other device configured to manage and control the network 130. The SDN controller 110 obtains and/or maintains a full topology view of the network 130. The SDN controller 110 computes forwarding paths through the network 130 according to the topology information. For example, the SDN controller 110 may employ a shortest path algorithm to determine a path between a source-destination pair in the network 130. After computing the paths, the SDN controller 110 sends forwarding instructions to the edge nodes 121 and to the internal nodes 122 to instruct the edge nodes 121 and the internal nodes 122 to forward packets according to the computed forwarding paths. The forwarding instructions may be dependent on the routing protocol. The SDN controller 110 communicates with all edge nodes 121 and all internal nodes 122 via a plurality of communication channels 140. The communication channels 140 are also referred to as controller-network communication channels. In some circumstances, the communication channels 140 are OpenFlow channels as described in the OpenFlow switch specification version 1.5.1 defined by Open Networking Foundation (ONF), Mar. 26, 2015.

The edge nodes 121 and the internal nodes 122 are software programmable network devices configured to perform forwarding functions in the network 130 according to forwarding instructions received from the SDN controller 110 via the communication channels 140. The edge nodes 121 are further configured to function as access points or interconnection points between the network 130 and other networks, which may be similar to the network 130 or different from the network 130 and may operate in other domains. For example, the edge nodes 121 may establish networking sessions and/or services with different networks, but may not exchange topology information across the different networks.

The network 130 may employ MPLS for data forwarding. In MPLS, data packets are assigned labels, which are referred to as path labels or segment labels, and the data packets are forwarded or directed on a LSP based on the labels. To establish a LSP between a source and a destination, the SDN controller 110 computes a shortest path through the network 130 for the LSP and reserves network resources such as bandwidths on the links 131 along the computed path of the LSP. The network resources are reserved for the LSP forever or until the LSP is deleted. The SDN controller 110 assigns path labels for the LSP and configures each edge node 121 and each internal node 122 along the path of the LSP. As an example, a LSP 171 traversing the edge node PE1 121, the internal nodes P1 and P2 122, and the edge node PE4 121 is established in the network 130. For example, the edge node PE1 121 is connected to the source and the edge node PE4 121 is connected to the destination. Thus, the edge node PE1 121 is referred to as an ingress node of the LSP 171, the edge node PE4 121 is referred to as an egress node of the LSP 171, and the internal nodes P1 and P2 122 are referred to as transit nodes of the LSP 171. Since the SDN controller 110 manages all network and label resources, the network 130 is not required to employ any Resource Reservation Protocol (RSVP) or label distribution protocol (LDP).

In a large-size SDN network, the management of all resources in the network may be complex and the number of communication channels 140 may be large. Thus, the design and implementation of the SDN controller 110 may be complex and costly. In addition, all edge nodes 121 and all internal nodes 122 in the network 130 are required to be upgraded to SDN-enabled nodes. For example, hardware-based network devices are required to be replaced with programmable or software programmable network devices. Thus, the deployment of the system 100 may be time consuming and costly.

Disclosed herein are various embodiments for creating a temporal LSP in a SDN network in one or more predetermined time intervals. The temporal LSP is scheduled to carry traffic in the predetermined time intervals. Some examples of traffic scheduling in a temporal LSP are disclosed in U.S. patent application Ser. No. 15/187,384 filed Jun. 20, 2016, by Chen, et al., entitled "Elegant Temporal Label Switched Path Tunnel Service Controller," the teachings and disclosure of which are hereby incorporated in their entireties by reference thereto. The disclosed embodiments employ a temporal SDN (T-SDN) controller or a temporal node (e.g., a switch, router, bridge, server, a client, etc.) configured to establish a temporal label switched path (T-LSP) through a network. In some embodiments, the T-SDN controller is able to communicate with other controllers outside the network to create and/or delete a temporal LSP that crosses multiple domains. In some embodiments, the T-SDN controller is equipped to create both a temporal LSP, which utilizes time intervals, and a non-temporal or normal LSP, which does not utilize time intervals. The temporal LSP and the normal LSP may be used concurrently to transport traffic. In some embodiments, the T-SDN controller manages edge nodes and/or intermediate nodes in the network. In some embodiments, the T-SDN controller instructs nodes in the network to make label reservations instead of the reservations being made by the T-SDN controller. The disclosed embodiments offer a variety of benefits including, for example, an increase in the efficiency of network resource usage, an ability to provide and/or reserve a tunnel service in advance, and the ability to meet new requirements of Internet Service Providers (ISPs) such as service scheduling and calendaring.

Figure 2:
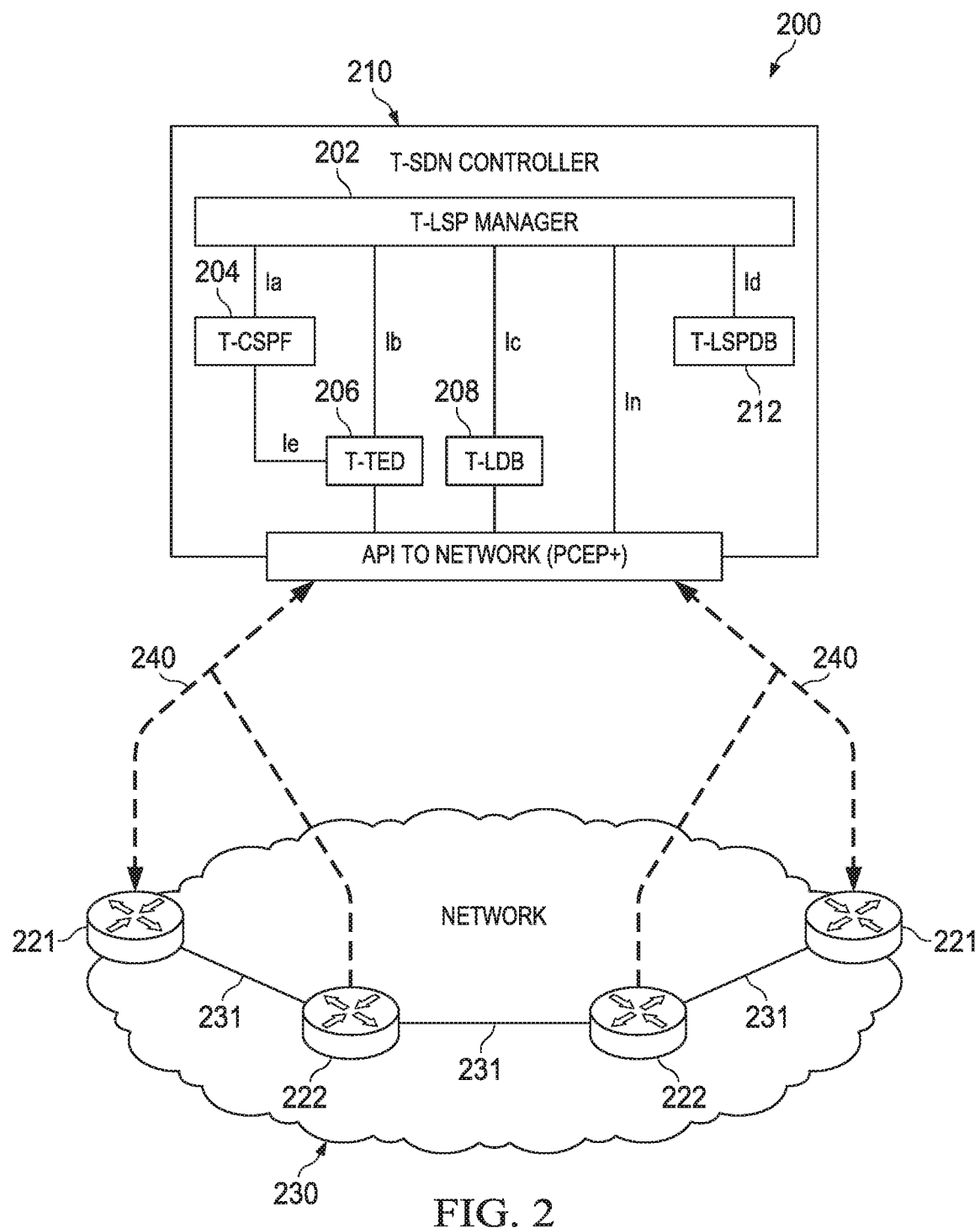
FIG. 2 is a schematic diagram of an embodiment of a temporal software defined network (T-SDN) controller managing a network corresponding to a centralized model for a single domain.

FIG. 2 is a schematic diagram of an embodiment of a SDN system 200 including a T-SDN controller 210 configured to manage a network 230. The schematic diagram depicts a centralized model for a single domain. The SDN system 200, the T-SDN controller 210, and the network 230 in FIG. 2 are similar to the SDN system 100, the T-SDN controller 110, and the network 130 of FIG. 1. As shown, the network 230 contains a plurality of edge nodes 221 (e.g., ingress nodes or egress nodes) and internal nodes 222 (e.g., intermediate nodes) connected by links 231. The edge nodes 221, the internal nodes 222, and links 231 of FIG. 2 are similar to the edge nodes 121, the internal nodes 122, and links 131 of FIG. 1.

In an embodiment, the T-SDN controller 210 is configured to establish a temporal LSP through the network 230. To do so, the SDN controller 210 communicates with the edge nodes 221 and the internal nodes 222 via a plurality of communication channels 240. The T-SDN controller 210 includes a temporal label switched path (T-LSP) manager 202, a temporal constrained shortest path first (T-CSPF) element 204, a temporal traffic engineering database (T-TED) 206, a temporal label database (T-LDB) 208, a temporal LSP database (T-LSPDB) 212, and a network interface (In).

The T-LSP manager 202 is configured to receive a path request from, for example, an application or network administrator requesting an LSP be established. In an embodiment, the path request includes time intervals and a set of constraints for the LSP. As will be more fully explained below, the T-LSP manager 202 establishes a path using the T-CSPF element 204. The T-LSP manager 202 also reserves or releases bandwidth in the T-TED 206 corresponding to the time intervals contained in the path message. The T-LSP manager 202 creates or deletes the LSP along a computed path in the network 230 by sending a request to one or more of the nodes 221, 222 in the network 230. In addition, the T-LSP manager 202 updates a status of the LSP to up or down and notifies the application, the user of the application, or network administrator of the status. In an embodiment, the T-LSP manager 202 is operably coupled to the network 230 through network interface (In).

The T-CSPF element 204, which may be generically referred to as a temporal path element, is operably coupled to the T-LSP manager 202. In an embodiment, the T-CSPF element 204 is in communication with the T-LSP manager 202 through an interface (Ia) and in communication with the T-TED 206 through an interface (Ie). The T-CSPF element 204 is configured to receive the path request from the T-LSP manager 202, obtain traffic engineering information from the T-TED 206, compute a path satisfying the time intervals and the set of constraints based on the traffic engineering information obtained, and provide the path as computed to the T-LSP manager 202. In an embodiment, the traffic engineering information obtained from the T-TED 206 includes a bandwidth for each link 231 in the network 230 corresponding to the time intervals. In an embodiment, the T-CSPF element 204 is configured to compute a path for the LSP in a single domain (e.g., network 230).

The T-TED 206 is configured to maintain traffic engineering information (e.g., bandwidth) for each link 231 with time intervals in the network 230. The T-TED 206 is also configured to provide the traffic engineering information to the T-CSPF element 204 for use in computing the path upon request by the T-CSPF element 204. The T-TED 206 is operably coupled to the T-LSP manager 202 through an interface (Ib). The T-TED 206 is configured to reserve bandwidth corresponding to the path during the time intervals upon request by the T-LSP manager 202. In an embodiment, the T-TED 206 is also operably coupled to the network 230 through interface (In).

In an embodiment, the T-TED 206 may be updated by the following events. When a temporal LSP with a number of time intervals is to be created, the T-LSP manager 202 reserves in the T-TED 206 bandwidths on every link in each of the time intervals along the path for the LSP. When a temporal LSP with a number of time intervals is deleted, the T-LSP manager 202 releases bandwidths on every link in each of the time intervals along the path for the LSP. When a link is torn down, the traffic engineering (TE) information corresponding to the link is removed from the T-TED 206. When a link in the network is up, the TE information corresponding to the link is added into the T-TED 206.

The T-LDB 208 is configured to maintain a status of labels in the time intervals for each node 221, 222 and link 231 in the network 230. The T-LDB 208 is operably coupled to the T-LSP manager 202 through an interface (Ic). The T-LDB 208 is also configured to reserve labels for the links 231 during the time intervals upon request by the T-LSP manager 202. In an embodiment, the T-LDB 208 is also operably coupled to the network 230 through interface (In).

In an embodiment, the T-LDB 208 may be updated by the following events. When a temporal LSP with a number of time intervals is to be created, the T-LSP manager 202 reserves in the T-LDB 208 a label for every link in each of the time intervals along the path for the LSP. For a node specific label space, a label on the downstream node is assigned for the link. For a link specific label space, a label on the link is assigned for the link. When a temporal LSP with a number of time intervals is deleted, the T-LSP manager 202 releases the label for every link in each of the time intervals along the path for the LSP. When a node in the network is down, the label resources on the node is removed from the T-LDB 208 if a node specific label space is used. When a link in the network is down, the label resources on the link is removed from the T-LDB 208 if a link specific label space is used. When a node in the network is up, the label resources on the node is added into the T-LDB 208 if a node specific label space is used. When a link in the network is up, the label resources on the link is added into the T-LDB 208 if a link specific label space is used.

The T-LSPDB 212 is configured to store the time intervals, the set of constraints, the labels, the bandwidth, and the status for each LSP. The T-LSPDB 212 is operably coupled to the T-LSP manager 202 through an interface (Id). In an embodiment, the T-LDB 208 is also operably coupled to the network 230 through interface (In).

The network interface (In) is the interface between the T-SDN controller 210 and the network 230. In an embodiment, the network interface (In) is an application programming interface (API) to the network 230. In an embodiment, the network interface (In) utilizes a Path Computation Element (PCE) Communication Protocol (PCEP), a PCEP+, or any other suitable protocol for facilitating communication between the T-SDN controller 210 and the network 230 as would be recognized by one skilled in the art upon reviewing this disclosure.

The network interface (In) permits the T-LSP manager 202 to communicate with the nodes 221, 222, in the network 230 to establish a temporal LSP along the path as computed. In an embodiment, the temporal LSP is set up at a start of each of the time intervals and deleted at an end of each of the time intervals. In an embodiment, the temporal LSP is set up prior to or at a start of a first of the time intervals, the bandwidth is updated for each of the time intervals, and the LSP is deleted at an end of a last of the time intervals.

Figure 3:
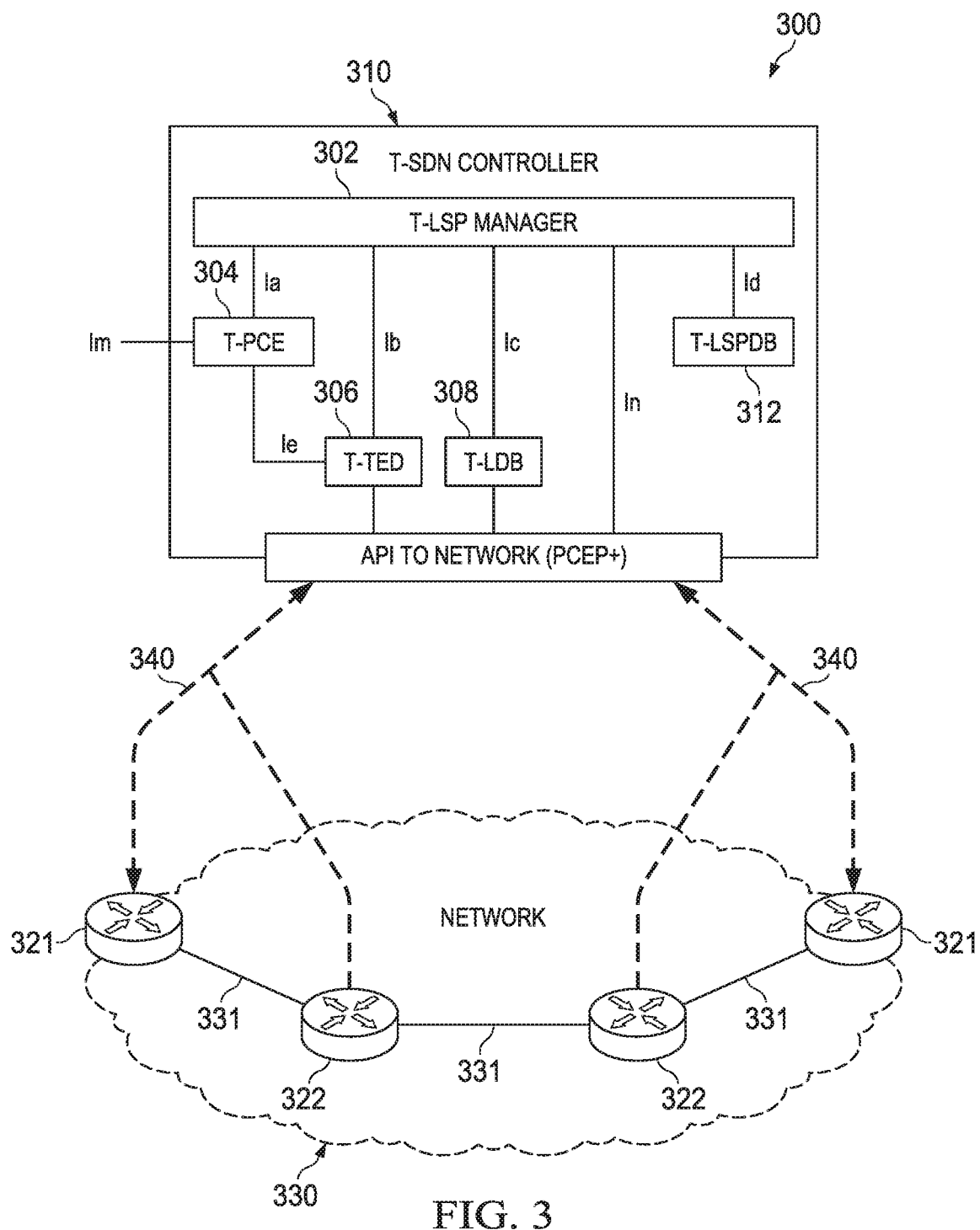
FIG. 3 is a schematic diagram of an embodiment of a T-SDN controller managing a network corresponding to a centralized model for multiple domains.

FIG. 3 is a schematic diagram of an embodiment of a SDN system 300 including a T-SDN controller 310 configured to manage a network 330. The schematic diagram depicts a centralized model for multiple domains. The SDN system 300, the T-SDN controller 310, and the network 330 in FIG. 3 are similar to the SDN system 100, 200, the SDN controller 110, 210, and the network 130, 230 of FIGS. 1-2. As shown, the network 330 contains a plurality of edge nodes 321 and internal nodes 322 connected by links 331. The edge nodes 321, the internal nodes 322, and links 331 of FIG. 3 are similar to the edge nodes 121, 221, the internal nodes 122, 222, and links 131, 231 of FIGS. 1-2.

In an embodiment, the T-SDN controller 310 is configured to establish a temporal LSP through the network 330 and at least one other network (e.g., an adjacent network). To do so, the T-SDN controller 310 communicates with the edge nodes 321 and the internal nodes 322 via a plurality of communication channels 340. The T-SDN controller 310 includes a T-LSP manager 302, a T-PCE 304, a T-TED 306, a T-LDB 308, a T-LSPDB 312, and a network interface (In). The T-LSP manager 302, the T-TED 306, the T-LDB 308, and the T-LSPDB 312 of FIG. 3 are similar to the T-LSP manager 202, the T-TED 206, the T-LDB 208, and the T-LSPDB 212 of FIG. 2. Therefore, the details of these elements will not be repeated for the sake of brevity. The T-PCE 304 may be generically referred to as a temporal path element.

Because the T-SDN controller 310 of FIG. 3 includes the T-PCE 304 instead of the T-CSPF 204 of FIG. 2, a temporal path through multiple domains (e.g., networks) may be computed. When a path request is received by the T-LSP manager 302, the T-PCE 304 communicates with another T-PCE in another network via an interface (Im). This communication permits an end-to-end temporal LSP to be established through the multiple domains. In an embodiment, if the path request received by the T-LSP manager 302 calls for a path through a single domain, the T-PCE 304 may utilize a T-CSPF incorporated in the T-PCE 304 to obtain a path for the LSP.

Figure 4:
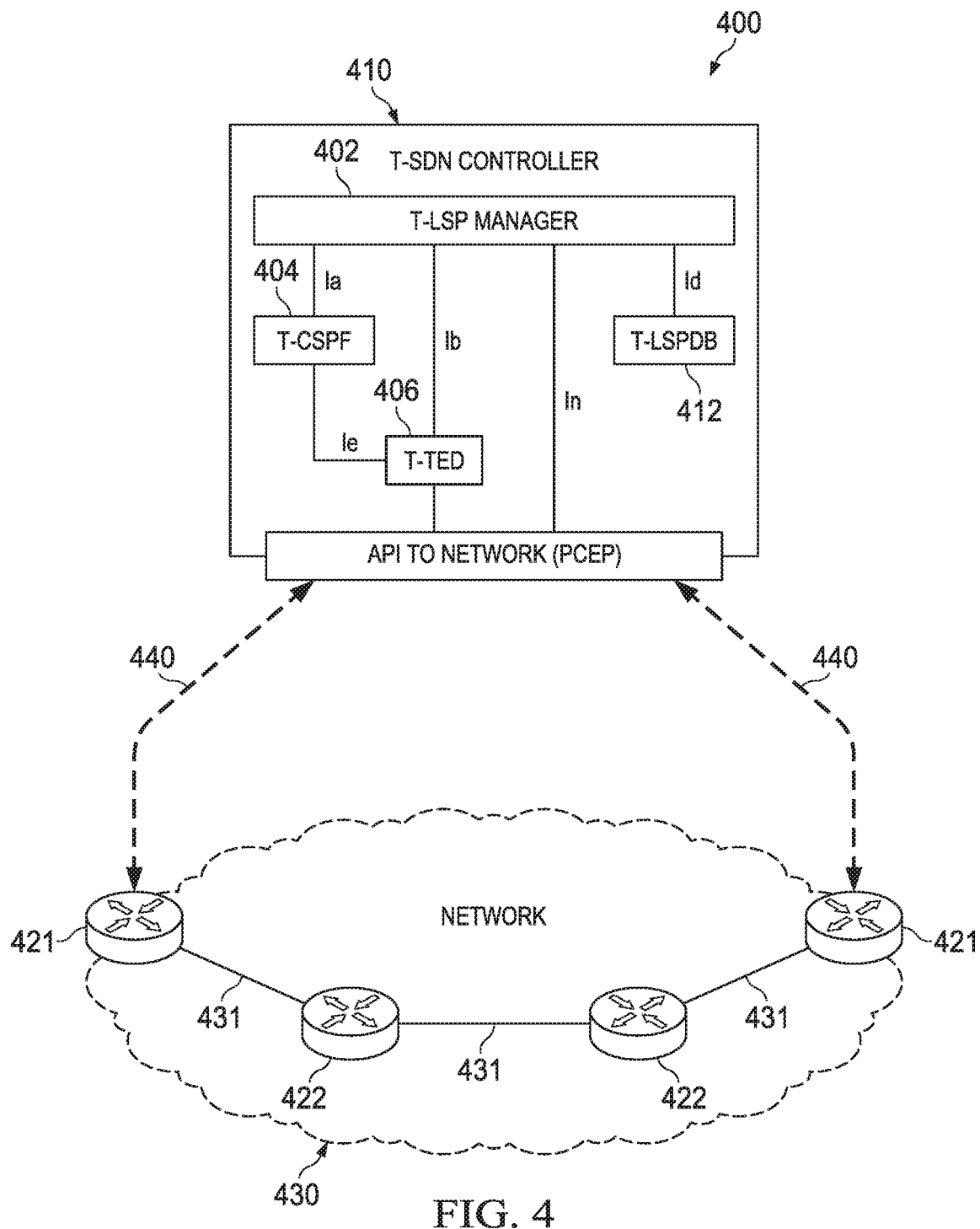
FIG. 4 is a schematic diagram of an embodiment of a T-SDN controller managing a network corresponding to a hybrid model for a single domain and one set of databases.

FIG. 4 is a schematic diagram of an embodiment of a SDN system 400 including a T-SDN controller 410 configured to manage a network 430. The schematic diagram depicts a hybrid model for a single domain with one set of databases. The SDN system 400, the T-SDN controller 410, and the network 430 in FIG. 4 are similar to the SDN system 100, 200, 300, the SDN controller 110, 210, 310, and the network 130, 230, 330 of FIGS. 1-3. As shown, the network 430 contains a plurality of edge nodes 421 and internal nodes 422 connected by links 431. The edge nodes 421, the internal nodes 422, and links 431 of FIG. 4 are similar to the edge nodes 121, 221, 321, the internal nodes 122, 222, 322, and links 131, 231, 331 of FIGS. 1-3.

In an embodiment, the T-SDN controller 410 is configured to establish a temporal LSP through the network 430. To do so, the T-SDN controller 410 communicates with the edge nodes 421 and the internal nodes 422 via a plurality of communication channels 440. The T-SDN controller 410 includes a T-LSP manager 402, a T-CSPF element 404, a T-TED 406, a T-LSPDB 412, and a network interface (In). In the embodiment of FIG. 4, the T-SDN controller 410 does not include a T-LDB. The T-LSP manager 402, the T-TED 406, and the T-LSPDB 412 of FIG. 4 are similar to the T-LSP manager 202, 302, the T-TED 206, 306, and the T-LSPDB 212, 312 of FIGS. 2-3. Therefore, the details of these elements will not be repeated for the sake of brevity.

Because the T-SDN controller 410 of FIG. 4 does not include a T-LDB, the nodes (e.g., the edge nodes 421) in the network 430 maintain the labels. In addition, no label information is stored in the T-LSPDB 412. In an embodiment, T-LSP manager 402 requests that the edge nodes 421 establish the temporal LSP along the path as computed by exchanging PATH and RESV messages with other nodes in the network using resource reservation protocol traffic engineering (RSVP-TE). The RSVP is described in further detail in Internet Engineering Task Force (IETF) document Request for Comments (RFC) 2205 entitled "Resource ReSerVation Protocol (RSVP)," by R. Braden, et al., dated September 1997, which is incorporated herein by reference.

Figure 5:
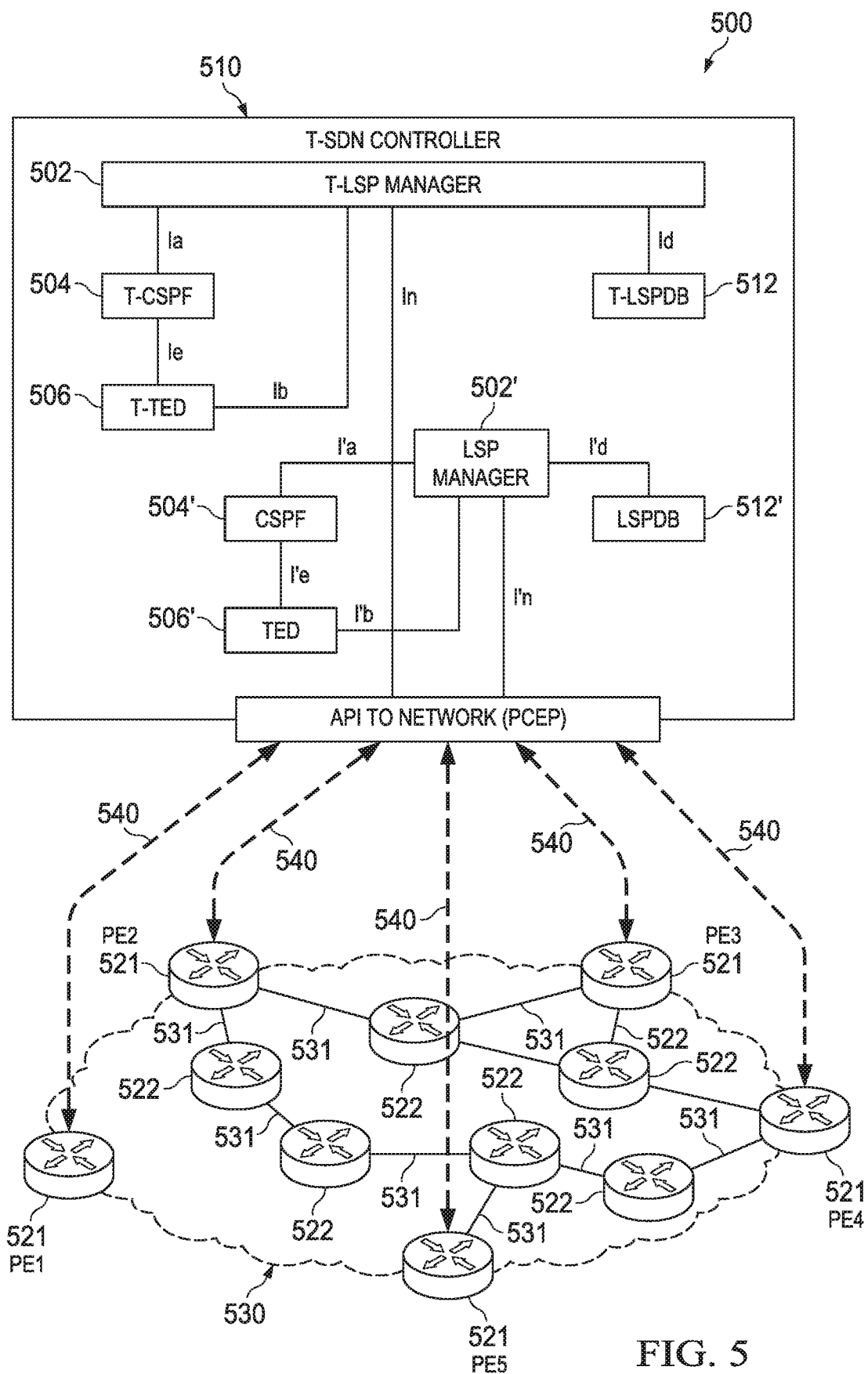
FIG. 5 is a schematic diagram of an embodiment of a T-SDN controller managing a network corresponding to a hybrid model for a single domain and two sets of databases and communication with edge nodes.

FIG. 5 is a schematic diagram of an embodiment of a SDN system 500 including a T-SDN controller 510 configured to manage a network 530. The schematic diagram depicts a hybrid model for a single domain with two sets of databases and communication with edge nodes 521. The SDN system 500, the T-SDN controller 510, and the network 530 in FIG. 5 are similar to the SDN system 100, 200, 300, 400, the SDN controller 110, 210, 310, 410, and the network 130, 230, 330, 430 of FIGS. 1-4. As shown, the network 530 contains a plurality of edge nodes 521 and internal nodes 522 connected by links 531. The edge nodes 521, the internal nodes 522, and links 531 of FIG. 5 are similar to the edge nodes 121, 221, 321, 421, the internal nodes 122, 222, 322, 422, and links 131, 231, 331, 431 of FIGS. 1-4.

In an embodiment, the T-SDN controller 510 is configured to establish a temporal LSP through the network 530. To do so, the SDN controller 510 communicates with the edge nodes 521 via a plurality of communication channels 540. In an embodiment, the SDN controller 510 does not utilize the internal nodes 522 in establishing the temporal LSP. The T-SDN controller 510 includes a T-LSP manager 502, a T-CSPF element 504, a T-TED 506, a T-LSPDB 512, and a network interface (In). The T-LSP manager 502, the T-CSPF 504, the T-TED 506, and the T-LSPDB 512 of FIG. 5 are similar to the T-LSP manager 202, 302, 402, the T-CSPF 204, 404, the T-TED 206, 306, 406, and the T-LSPDB 212, 312, 412 of FIGS. 2-4. Therefore, the details of these elements will not be repeated for the sake of brevity.

As shown, the T-SDN controller 510 of FIG. 5 also includes a regular or normal LSP manager 502'. The normal LSP manager 502' is operably coupled to a CSPF element 504', a TED 506', a LSPDB 512', and a network interface (I'n). As such, the LSP manager 502' is configured to establish an LSP without the time intervals corresponding to the path as computed. In other words, the T-SDN controller 510 includes a T-LSP manger 502 configured to establish a temporal LSP and a normal LSP manager 502' configured to establish an LSP. The temporal LSP and the normal LSP may be used concurrently to transport traffic through the network 530.

Figure 6:
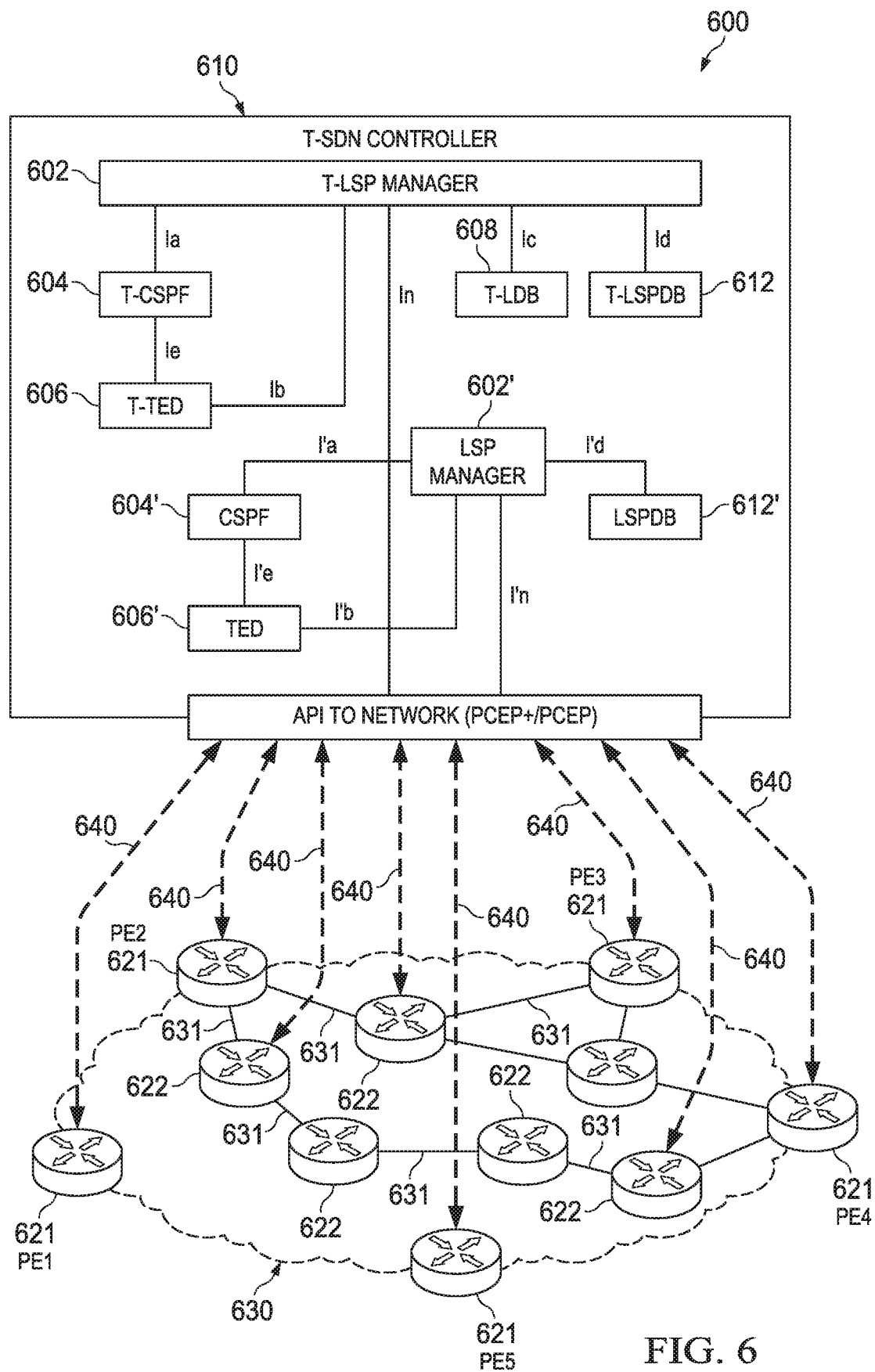
FIG. 6 is a schematic diagram of an embodiment of a T-SDN controller managing a network corresponding to a hybrid model for a single domain and two sets of databases and communication with edge and internal nodes.

FIG. 6 is a schematic diagram of an embodiment of a SDN system 600 including a T-SDN controller 610 configured to manage a network 630. The schematic diagram depicts a hybrid model for a single domain with two sets of databases and communication with both edge nodes 621 and internal nodes 622. In an embodiment, all nodes in the network 630 are managed. The SDN system 600, the SDN controller 610, and the network 630 in FIG. 6 are similar to the SDN system 100, 200, 300, 400, 500, the SDN controller 110, 210, 310, 410, 510, and the network 130, 230, 330, 430, 530 of FIGS. 1-5. As shown, the network 630 contains a plurality of edge nodes 621 and internal nodes 622 connected by links 631. The edge nodes 621, the internal nodes 622, and links 631 of FIG. 6 are similar to the edge nodes 121, 221, 321, 421, 521, the internal nodes 122, 222, 322, 422, 522, and links 131, 231, 331, 431, 531 of FIGS. 1-5.

Initially, a portion of network resources such as link bandwidth is allocated for the temporal LSPs and stored in the T-TED 506, another portion of network resources is allocated for the normal LSPs and stored in the TED 506'. In a first embodiment, a percentage of the network resources such as seventy percent of the link bandwidth for every link 531 is configured on the T-SDN controller for the temporal LSPs and stored in the T-TED 506 when the T-SDN controller starts, another percentage of the network resources such as twenty percents of the link bandwidth for every link 531 is configured on the T-SDN controller for the normal LSPs and stored in the TED 506'.

In a second embodiment, an amount of the network resources such as 10 GB link bandwidth for every link 531 is configured on the T-SDN controller for the temporal LSPs and stored in the T-TED 506 when the T-SDN controller starts, another amount of the network resources such as the rest link bandwidth for every link 531 is configured on the T-SDN controller for the normal LSPs and stored in the TED 506'.

In a third embodiment, when the T-SDN controller starts, a portion of the network resources such as sixty percent of the link bandwidth for every link 531 is configured on the T-SDN controller for the temporal LSPs and stored in the T-TED 506, the rest portion of the network resources such as forty percent of the link bandwidth for every link 531 is implied for the normal LSPs and stored in the TED 506'.

In an embodiment, the T-SDN controller 610 is configured to establish a temporal LSP through the network 630. To do so, the SDN controller 610 communicates with the edge nodes 621 and the internal nodes 622 via a plurality of communication channels 640. The T-SDN controller 610 includes a T-LSP manager 602 and an LSP manager 602', a T-CSPF element 604 and a CSPF element 604', a T-TED 606 and a TED 606', a T-LDB 608, a T-LSPDB 612 and a LSPDB 612', and a network interface (In) and a network interface (I'n). The T-LSP manager 602 and an LSP manager 602', the T-CSPF element 604 and the CSPF element 604', the T-TED 606 and the TED 606', the T-LDB 608, the T-LSPDB 612 and the LSPDB 612', and the network interface (In) and the network interface (I'n) of FIG. 6 are similar to the T-LSP manager 502 and the LSP manager 502', the T-CSPF element 504 and the CSPF element 504', the T-TED 506 and the TED 506', the T-LSPDB 512 and the LSPDB 512', and the network interface (In) and the network interface (I'n) of FIG. 5. In addition, the T-LDB 608 is similar to the T-LDB 208, 308 of FIGS. 2-3. Therefore, the details of these elements will not be repeated for the sake of brevity.

The T-LSP manager 602 is configured to establish a temporal LSP, while the LSP manager 502' is configured to establish an LSP without the time intervals. The temporal LSP and the normal LSP may be used concurrently to transport traffic through the network 630. Like the T-LDB 208, 308 in FIGS. 2-3, the T-LDB 608 is configured to maintain a status of labels in the time intervals for each node 621, 622 and link 631 in the network 630.

Initially, a portion of network resources including label resources is allocated for the temporal LSPs and stored in the T-TED 606 and T-LDB 608, another portion of network resources is allocated for the normal LSPs and stored in the TED 606'. In a first embodiment, when the T-SDN controller starts, a percentage of the bandwidth resources such as sixty percents of the link bandwidth for every link 631 is configured on the T-SDN controller and stored in the T-TED 606, a range of the label space such as from 2000 to 80000 for every node 621 and 622 is configured for the temporal LSPs on the T-SDN controller and stored in the T-LDB 608, and the same range of the label space for every node 621 and 622 is also configured on the node and stored in the node; another percentage of the bandwidth resources such as thirty percents of the link bandwidth for every link 631 is configured for the normal LSPs and stored in the TED 606', and the rest range of the label space for every node 621 and 622 is used for the normal LSPs on the node.

In a second embodiment, when the T-SDN controller starts, an amount of the bandwidth resources such as 50 GB link bandwidth for every link 631 is configured on the T-SDN controller for the temporal LSPs and stored in the T-TED 606, a range of the label space for every node 621 and 622 is configured for the temporal LSPs on the T-SDN controller and stored in the T-LDB 608, and the same range of the label space for every node 621 and 622 is also configured on the node and stored in the node; another amount of the bandwidth resources such as the rest link bandwidth for every link 631 is configured on the T-SDN controller for the normal LSPs and stored in the TED 606', and the rest range of the label space for every node 621 and 622 is used for the normal LSPs on the node.

In a third embodiment, when the T-SDN controller starts, a portion of the bandwidth resources such as seventy percent of the link bandwidth for every link 631 is configured for the temporal LSPs on the T-SDN controller and stored in the T-TED 606, a range of the label space such as from 1000 to 90000 for every node 621 and 622 is configured for the temporal LSPs on the T-SDN controller and stored in the T-LDB 608, and the same range of the label space for every node 621 and 622 is also configured on the node and stored in the node; the rest portion of the bandwidth resources such as thirty percent of the link bandwidth for every link 631 is implied for the normal LSPs and stored in the TED 606', and the rest range of the label space for every node 621 and 622 is implied for the normal LSPs on the node.

Figure 7:
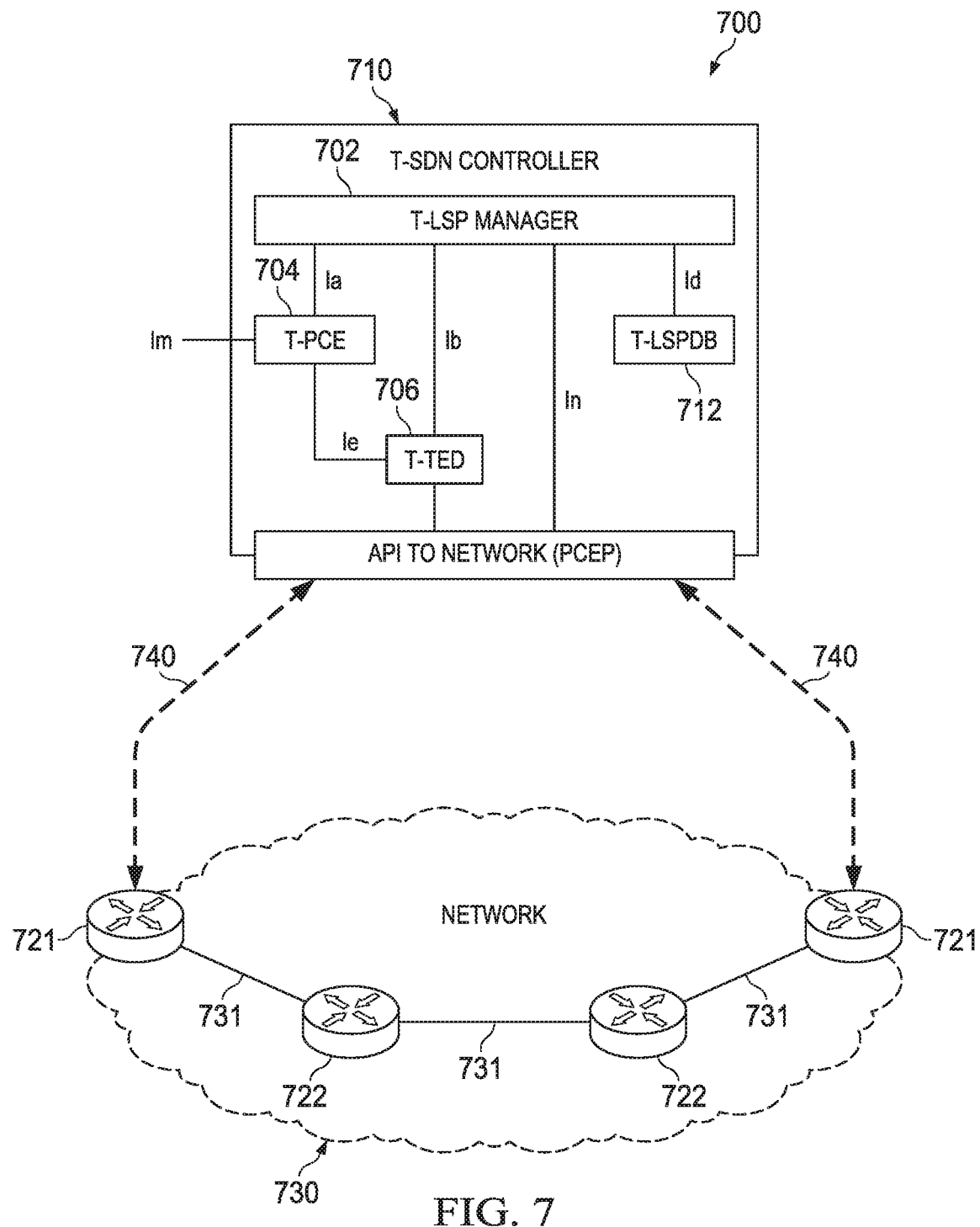
FIG. 7 is a schematic diagram of an embodiment of a T-SDN controller managing a network corresponding to a hybrid model for multiple domains.

FIG. 7 is a schematic diagram of an embodiment of a SDN system 700 including a T-SDN controller 710 configured to manage a network 730. The schematic diagram depicts a hybrid model for multiple domains. The SDN system 700, the T-SDN controller 710, and the network 730 in FIG. 7 are similar to the SDN system 300, the T-SDN controller 310, and the network 330 of FIG. 3 except that the T-SDN controller 710 does not contain a T-LDB. As shown, the network 730 contains a plurality of edge nodes 721 and internal nodes 722 connected by links 731. The edge nodes 721, the internal nodes 722, and links 731 of FIG. 7 are similar to the edge nodes 321, the internal nodes 322, and links 331 of FIG. 3.

In an embodiment, the T-SDN controller 710 is configured to establish a temporal LSP through the network 730 and at least one other network (e.g., an adjacent network). To do so, the T-SDN controller 710 communicates with the edge nodes 721 and the internal nodes 722 via a plurality of communication channels 740. The T-SDN controller 710 includes a T-LSP manager 702, a T-PCE 704, a T-TED 706, a T-LSPDB 712, and a network interface (In). The T-LSP manager 702, the T-TED 706, and the T-LSPDB 712 of FIG. 7 are similar to the T-LSP manager 302, the T-TED 306, and the T-LSPDB 312 of FIG. 3. Therefore, the details of these elements will not be repeated for the sake of brevity.

Because the T-SDN controller 710 of FIG. 7 includes the T-PCE 704, a temporal path through multiple domains (e.g., networks) may be computed. When a path request is received by the T-LSP manager 702, the T-PCE 704 communicates with another T-PCE in another network via an interface (Im). This communication permits an end-to-end temporal LSP to be established through the multiple domains. In an embodiment, if the path request received by the T-LSP manager 702 calls for a path through a single domain, the T-PCE 704 may utilize a T-CSPF incorporated in the T-PCE 704 to obtain a path for the LSP. Because the T-SDN controller 710 of FIG. 7 does not include a T-LDB, the nodes (e.g., the edge nodes 721) in the network 730 maintain the labels. In addition, no label information is stored in the T-LSPDB 712.

Figure 8:
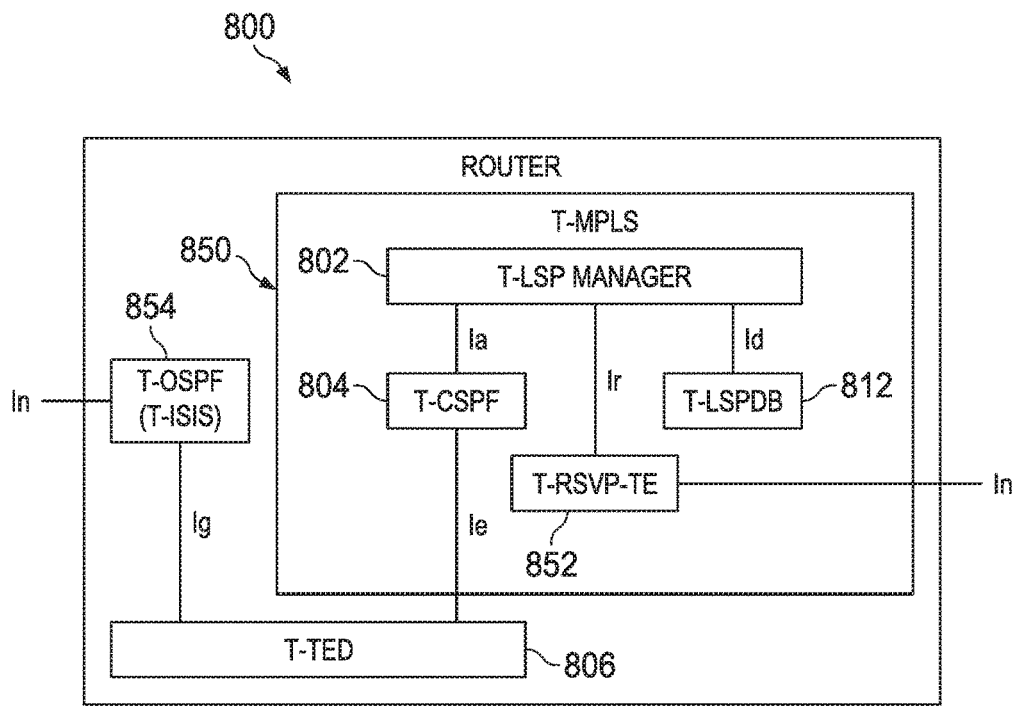
FIG. 8 is a schematic diagram of an embodiment of a network node (e.g., router) corresponding to a distributed model.

FIG. 8 is a schematic diagram of an embodiment of network node 800. The network node 800 is similar to the edge nodes 121-721 and the internal nodes 122-722 in FIGS. 1-7. In an embodiment, the network node 800 is any device (e.g., an access point, an access point station, a router, a switch, a gateway, a bridge, a server, a client, a user-equipment, a mobile communications device, etc.) which transports data through a network, system, and/or domain. The schematic diagram of FIG. 8 depicts a distributed model for managing a temporal LSP. In the distributed model, a network node (e.g., an ingress node for a LSP tunnel) establishes the temporal LSP instead of the temporal LSP being set-up by a SDN controller (e.g., T-SDN controller 210). The network node 800 may be referred to as a temporal network node.

As shown, the network node 800 includes a temporal MPLS (T-MPLS) element 850, a T-TED 806, and a protocol element 854. In an embodiment, the protocol element 854 is a temporal open shortest path first (T-OSPF) element. In an embodiment, the protocol element 854 is a temporal Intermediate System to Intermediate System (T-ISIS) element. The T-MPLS 850 contains a T-LSP manager 802, a T-CSPF element 804, a T-LSPDB 812, and a temporal resource reservation protocol traffic engineering (T-RSVP-TE) element 852. The T-LSP manager 802, the T-CSPF element 804, the T-TED 806, and the T-LSPDB 812 of FIG. 8 are similar to the T-LSP manager 202, the T-CSPF element 204, the T-TED 206, and the T-LSPDB 212 of FIG. 2. Therefore, the details of these elements will not be repeated for the sake of brevity.

After a path has been computed and provided to the T-LSP manager 802 as previously described herein, the T-LSP manager 802 stores the intervals and the set of constraints in the T-LSPDB 812. The T-LSP manager 802 also sends a request to the T-RSVP-TE element 852 to initiate the set-up of an LSP (e.g., LSP tunnel). The request is sent to the T-RSVP-TE element 852 via interface (Ir). In an embodiment, the T-RSVP-TE element 852 exchanges PATH and RESV messages with other nodes in the network in order to set up the LSP corresponding to the time intervals and the set of constraints.

Once bandwidth has been reserved by the network node 800 to facilitate the temporal LSP satisfying the time intervals and the set of constraints, the bandwidth on the links between nodes will be changed. Those changed bandwidths are distributed to the protocol element 854 via interface (In) coupled to the protocol element 854. In other words, the protocol element 854 distributes bandwidth changes in the network. For example, the protocol element 854 distributes current link bandwidth to adjacent nodes. In an embodiment, the bandwidth changes are stored in the T-TED 806 via interface (Ig).

Figure 9:
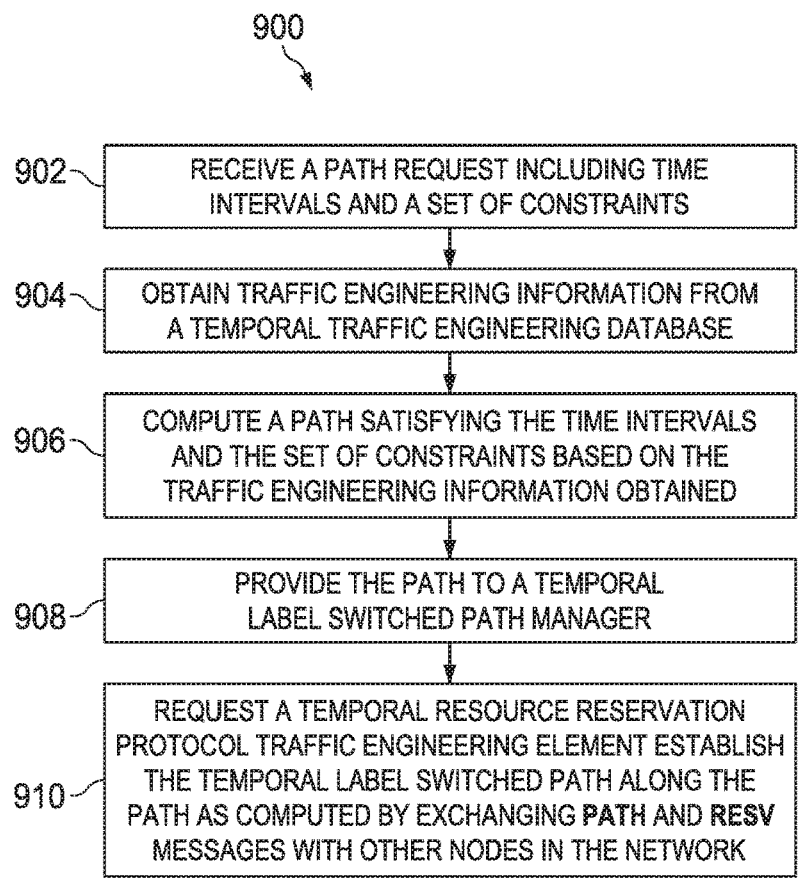
FIG. 9 is a method for establishing a temporal label switched path (T-LSP) implemented in a node in a network.

FIG. 9 is a method 900 for establishing a temporal label switched path (T-LSP) implemented in a node (e.g., network node 800) in a network. The method 900 may be performed when a temporal LSP is to be established through a network. The network may be similar to the network 230 of FIG. 2. At step 902, a T-LSP manager of the network node receives a path request. The T-LSP manager may be similar to the T-LSP manager 202 in FIG. 2. The path request includes, for example, time intervals and a set of constraints. At step 904, a T-CSPF element of the network node obtains traffic engineering information from a T-TED. The T-CSPF element may be similar to the T-CSPF element 204 in FIG. 2. At step 906, the T-CSPF computes a path satisfying the time intervals and the set of constraints based on the traffic engineering information obtained. At step 908, T-CSPF element provides the path as computed to the T-LSP manager.

At step 910, the T-LSP manager of the network node requests a T-RSVP-TE element to establish the temporal LSP along the path as computed. The T-RSVP-TE element is able to establish the temporal LSP along the path by exchanging PATH and RESV messages with other nodes in the network. Such other nodes include, for example, intermediate or internal nodes and an egress nodes in the network. In an embodiment, the time intervals and the set of constraints are stored in a T-LSPDB operably coupled to the T-LSP manager after the path has been computed. The T-LSPDB may be similar to the T-LSPDB 212 in FIG. 2. In an embodiment, the current link bandwidth is distributed to the other nodes in the network and changes in the current link bandwidth are stored in the T-TED. The T-TED may be similar to the T-TED 206 in FIG. 2.

Figure 10:
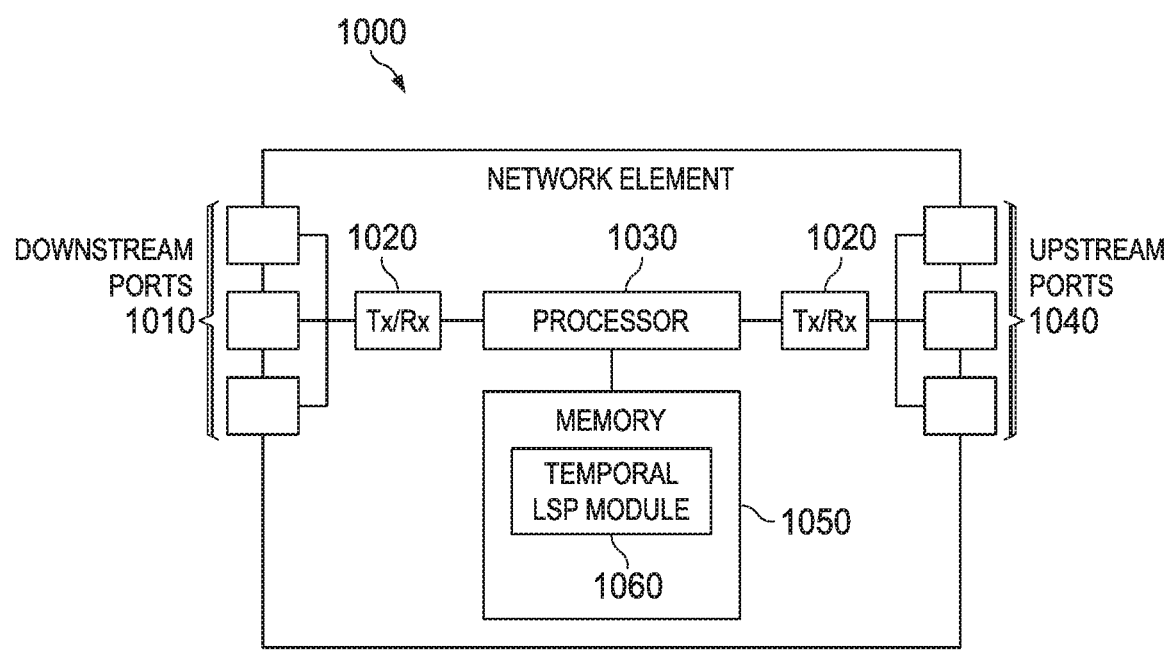
FIG. 10 is a schematic diagram of a network element according to an embodiment of the disclosure.

At least some of the features/methods described in this disclosure are implemented in a network element (e.g., one of the T-SDN-controllers 210-710 or the network node 800). For instance, the features/methods of this disclosure may be implemented using hardware, firmware, and/or software installed to run on hardware. FIG. 10 is a schematic diagram of an embodiment of a network element 1000 that may be used to transport and process traffic through at least a portion of a network, such as network 230, shown in FIG. 2. The network element 1000 is any device (e.g., an access point, an access point station, a router, a switch, a gateway, a bridge, a server, a client, a user-equipment, a mobile communications device, etc.) which transports data through a network, system, and/or domain. Moreover, the terms network element, network node, network component, network module, network controller, and/or similar terms may be interchangeably used to generally describe a network device and do not have a particular or special meaning unless otherwise specifically stated and/or claimed within the disclosure.

The network element 1000 comprises one or more downstream ports 1010 coupled to a transceiver (Tx/Rx) 1020, which comprise transmitters, receivers, or combinations thereof. The Tx/Rx 1020 transmits and/or receives frames from other network nodes via the downstream ports 1010. Similarly, the network element 1000 comprises another Tx/Rx 1020 coupled to a plurality of upstream ports 1040, wherein the Tx/Rx 1020 transmits and/or receives frames from other nodes via the upstream ports 1040. The downstream ports 1010 and/or the upstream ports 1040 include electrical and/or optical transmitting and/or receiving components. In another embodiment, the network element 1000 comprises one or more antennas coupled to the Tx/Rx 1020. The Tx/Rx 1020 transmits and/or receives data (e.g., packets) from other network elements via wired or wireless connections, depending on the embodiment.

A processor 1030 is coupled to the Tx/Rx 1020 and is configured to process the frames and/or determine to which nodes to send (e.g., transmit) the packets. In an embodiment, the processor 1030 comprises one or more multi-core processors and/or memory modules 1050, which function as data stores, buffers, etc. The processor 1030 is implemented as a general processor or as part of one or more application specific integrated circuits (ASICs), field-programmable gate arrays (FPGAs), and/or digital signal processors (DSPs). Although illustrated as a single processor, the processor 1030 is not so limited and may comprise multiple processors. The processor 1030 is configured to communicate and/or process multi-destination frames.

FIG. 10 illustrates that a memory module 1050 is coupled to the processor 1030 and is a non-transitory medium configured to store various types of data and/or instructions. Memory module 1050 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs which are loaded into the RAM when such programs are selected for execution. The ROM is used to store instructions and perhaps data that are read during program execution. The ROM is a non-volatile memory device which typically has a small memory capacity relative to the larger memory capacity of the secondary storage. The RAM is used to store volatile data and perhaps to store instructions. Access to both the ROM and RAM is typically faster than to the secondary storage.

The memory module 1050 is used to house the instructions for carrying out the various embodiments described herein. In one embodiment, the memory module 1050 comprises a temporal LSP module 1060 which is implemented via execution by the processor 1030. In an alternate embodiment, the processor 1030 comprises the temporal LSP module 1060. In one embodiment, the temporal LSP module 1060 is implemented according to embodiments of the present disclosure to perform temporal LSP tunnel services in an MPLS network, such as network 100. In an alternate embodiment, the temporal LSP module 1060 may be implemented on different network elements (e.g., a SDN controller or a network node) or across a plurality of network elements (NEs). In an embodiment, temporal LSP module 1060 implements method 900 of FIG. 9. In addition, network element 1000 may comprise any other means for implementing the temporal LSP module as would be appreciated by one skilled in the art upon review of this disclosure.

It is understood that by programming and/or loading executable instructions onto the network element 1000, at least one of the processors 1030, the cache, and the long-term storage are changed, transforming the network element 1000 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

In an embodiment, the T-SDN controller (e.g., the T-SDN controller 210) is configured as a temporal stateful PCE (T-Stateful-PCE) controller. In such an embodiment, the T-SDN may include, for example, a T-LSP manager, a T-PCE, a T-TED, and a T-LSPDB configured to function like similarly identified components herein. After obtaining the path for the LSP, the T-Stateful-PCE controller is configured to reserve the TE resources (e.g., link bandwidths for the LSP along the path in each of the time intervals) in the T-TED, update the information about the LSP in the T-LSPDB, initiate the creation of the LSP at the start of each time interval by sending a Path Computation LSP Initiate Request (PCInitiate) message to the ingress of the LSP, and deleting the LSP at the end of each time interval by sending another PCInitiate message with a remove (R) flag set to a binary number (e.g., 1). The T-Stateful-PCE controller updates the information about the LSP in the T-LSPDB accordingly after receiving a Path Computation LSP State Report (PCRpt) message from the ingress of the LSP.

Disclosed herein is a temporal software defined network (T-SDN) controller configured to manage a network containing a plurality of nodes connected by links. The controller includes first means for receiving a path request, wherein the path request includes time intervals and a set of constraints. The controller includes a second means for receiving the path request from the first means, means for obtaining traffic engineering information. The controller also includes means for computing a path satisfying the time intervals and the set of constraints based on the traffic engineering information obtained, and means for providing the path as computed to the first means for receiving the path request, means for providing the traffic engineering information to the second means for use in computing the path upon request by the second means for receiving the path request, and means for reserving bandwidth corresponding to the path during the time intervals upon request by the first means for receiving the path request. The controller also includes means for reserving labels for the links during the time intervals upon request by the first means for receiving the path request, means for storing the time intervals, the set of constraints, the labels, and the bandwidth, and means for permitting the first means for receiving the path request to communicate with the nodes in the network to establish a temporal LSP along the path as computed.

Disclosed herein is a temporal software defined network (T-SDN) controller configured to manage a network containing a plurality of nodes connected by links. The controller includes first means for receiving a path request, wherein the path request includes time intervals and a set of constraints. The controller also includes second means for receiving the path request from the first means for receiving the path request, means for obtaining traffic engineering information, means for computing a path satisfying the time intervals and the set of constraints based on the traffic engineering information obtained, and means for providing the path as computed to the first means for receiving the path request. The controller also includes means for providing the traffic engineering information to the second means for receiving the path request for use in computing the path upon request by the second means for receiving the path request, and means for reserving bandwidth corresponding to the path during the time intervals upon request by the first means for requesting the path request, means for storing the time intervals, the set of constraints, and the bandwidth, and means for permitting the first means for receiving the path request to instruct an ingress node in the network to establish a temporal LSP along the path as computed.

Disclosed herein is a method for establishing a temporal label switched path (T-LSP) implemented in a node in a network including means for receiving a path request including time intervals and a set of constraints, means for obtaining traffic engineering information from a temporal traffic engineering database (T-TED), means for computing a path satisfying the time intervals and the set of constraints based on the traffic engineering information obtained, means for providing the path as computed to the means for obtaining, and means for requesting a temporal resource reservation protocol traffic engineering (T-RSVP-TE) means to establish the temporal LSP along the path as computed by exchanging PATH and RESV messages with other nodes in the network.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for establishing a temporal label switched path (LSP) implemented in a controller in a network, comprising:
   receiving a path request including a time interval and a set of constraints;
   obtaining traffic engineering information from a first database;
   computing, by the controller, a path satisfying the time interval and the set of constraints based on the traffic engineering information obtained;
   storing the time interval and the set of constraints in a second database; and
   instructing an ingress node of the temporal LSP to signal the temporal LSP in the network along the path computed at a start of the time interval identified in the path request and to tear down the temporal LSP at an end of the time interval identified in the path request,
   wherein the temporal LSP crosses multiple domains, and wherein each of the multiple domains is controlled by a separate controller.

2. The method of claim 1, further comprising distributing current link bandwidth to other nodes and storing changes in the current link bandwidth in the first database.

3. The method of claim 1, wherein the traffic engineering information comprises a bandwidth for each link in the network corresponding to the time interval.

4. The method of claim 1, wherein the first database is a temporal traffic engineering database (T-TED).

5. The method of claim 1, wherein the second database is a temporal LSP database (T-LSPDB).

6. The method of claim 1, further comprising establishing an LSP without the time interval corresponding to the path as computed.

7. The method of claim 1, wherein the controller is a temporal software defined network (T-SDN) controller.

8. The method of claim 1, further comprising receiving the path request from a network administrator.

9. The method of claim 1, further comprising receiving the path request from an application.

10. A controller configured to establish a temporal label switched path (LSP), the controller comprising:
    a memory storage comprising instructions; and
    a processor in communication with the memory, wherein the processor executes the instructions to cause the controller to:
       receive a path request including a time interval and a set of constraints;
       obtain traffic engineering information from a first database;
       compute a path satisfying the time interval and the set of constraints based on the traffic engineering information obtained;
       store the time interval and the set of constraints in a second database; and
       instruct an ingress node of the temporal LSP to signal the temporal LSP in a network along the path computed at a start of the time interval identified in the path request and to tear down the temporal LSP at an end of the time interval identified in the path request,
       wherein the temporal LSP crosses multiple domains, and wherein each of the multiple domains is controlled by a separate controller.

11. The controller of claim 10, wherein the processor executes the instructions to cause the controller to distribute current link bandwidth to other nodes and store changes in the current link bandwidth in the first database.

12. The controller of claim 10, wherein the traffic engineering information comprises a bandwidth for each link in the network corresponding to the time interval.

13. The controller of claim 10, wherein the first database is a temporal traffic engineering database (T-TED).

14. The controller of claim 10, wherein the second database is a temporal LSP database (T-LSPDB).

15. The controller of claim 10, wherein the processor executes the instructions to cause the controller to establish an LSP without the time interval corresponding to the path as computed.

16. The controller of claim 10, wherein the controller is a temporal software defined network (T-SDN) controller.

17. The controller of claim 10, wherein the path request is received from a network administrator or an application.

* * * * *